United States Patent [19]
Grosskopf et al.

[11] Patent Number: 5,100,243
[45] Date of Patent: Mar. 31, 1992

[54] SELF-CALIBRATING HOT WHEEL DETECTOR FOR RAILROADS

[75] Inventors: George Grosskopf, Coram; W. Woodward Sanville, Brentwood, both of N.Y.

[73] Assignee: Servo Corporation of America, Hicksville, N.Y.

[21] Appl. No.: 626,204

[22] Filed: Dec. 12, 1990

[51] Int. Cl.$^5$ .................................. G01K 15/00
[52] U.S. Cl. ................................. 374/2; 374/121; 374/128
[58] Field of Search ............. 374/2, 120, 121x, 126, 374/128x, 129, 132, 173; 324/239; 250/342, 393

[56] References Cited

U.S. PATENT DOCUMENTS

| | | | |
|---|---|---|---|
| 3,151,827 | 10/1964 | Gallagher et al. | 324/239 |
| 3,303,340 | 2/1967 | Hewett et al. | 356/43 |
| 3,451,254 | 6/1969 | Maley | 374/5 |
| 3,461,284 | 8/1969 | Joy | 374/132 |
| 3,998,549 | 12/1976 | Pusch et al. | 374/129 |
| 4,283,934 | 8/1981 | Seiss | 374/2 |
| 4,820,057 | 4/1989 | Berndt | 374/121 |

*Primary Examiner*—William A. Cuchlinski, Jr.
*Assistant Examiner*—G. Bradley Bennett
*Attorney, Agent, or Firm*—Kane, Dalsimer, Sullivan, Kurucz, Levy, Eisele and Richard

[57] ABSTRACT

This invention relates to a device for monitoring the temperature of the wheels of passing railroad cars. More particularly, this device includes a self-calibration function wherein a predetermined heat source is attached to the device, a fixed amplifier amplifies the resulting electric signal so as to generate a signal comparable in magnitude to that generated by a passing train, a variable gain amplifier further amplifies the signal, and the resulting signal is converted to a digital signal. The digital signal is used as a signal to the feedback input of a variable gain amplifier. In response to the digital signal, the variable gain amplifier adjusts its gain until the feedback signal reaches a predetermined value.

5 Claims, 4 Drawing Sheets

SELF-CALIBRATING HOT WHEEL DETECTOR FOR RAILROADS

BACKGROUND OF THE INVENTION

1. Field of the Invention

This invention relates to an infrared detector for scanning the temperature of the passing wheels of railroad cars and, more particularly, to a self-calibration system therefor.

2. Description of the Prior Art

It is well-known that overheated railroad wheels, typically caused by a defective brake mechanism or by improperly prolonged brake application, can lead to serious malfunctions of railroad equipment—including thermal cracks in the wheel which may extend into the wheel plate, and softening of wheel rims which leads to non-circular wheels (i.e., "flats") which can damage wheel bearings and crack rail sections—and result in fuel inefficiencies, costly field repairs, and even derailment.

It is well-known in the prior art to scan passing railroad wheels with an infrared-type apparatus to detect overheated railroad wheels before the aforementioned serious consequences occur. However, calibration of this apparatus due to changing sensor characteristics is required to maintain accurate readings. In the prior art, this calibration is done manually by simply varying the gain of an analog amplifier under test conditions until the desired result is achieved. This is deficient in that a high skill level is required of the technician to achieve an accurate result. This is further deficient in that the external adjustment to the amplifier gain, typically through a potentiometer, makes the apparatus vulnerable to vandalism.

Moreover, the prior art uses analog measurement devices associated with the sensor. Such devices use analog comparators for alarming devices which do not satisfactorily account for the differences in compensation required for scanning wheels on both the near and far rails due to differences in distance between the rails and the scanner. Similarly, such devices typically do not indicate the precise location of the overheated wheel.

OBJECTS AND SUMMARY OF THE INVENTION

It is therefore an object of this invention to provide a digitized method and apparatus for the monitoring of the temperature of passing railroad wheels.

It is therefore a further object of this invention to provide a method and apparatus for the automatic calibration of a digitized device for the monitoring of the temperature of passing railroad wheels which reduces the required skill of the technician and reduces the exposure of the device to vandalism.

It is therefore a still further object of this invention to provide a method and apparatus for the monitoring of the temperature of passing railroad wheels which automatically compensates for the differences in readings from wheels on the far rails and from wheels on the near rails.

It is therefore a final object of this invention to provide a method and apparatus for the monitoring of the temperature of passing railroad wheels which precisely locates the overheated wheels.

The invention includes an infrared sensor to monitor the radiant energy emanating from, and hence the temperature of, passing railroad wheels. The sensor is placed at angle of 31° from a line perpendicular to the railroad track. This allows the sensor to monitor temperature of wheels on both the near and far rails. The invention includes pre-amplification and signal conditioning means. The invention further includes an amplifier which is by-passed during normal operation but which is switched into the circuit during calibration so as to compensate for the reduced radiant energy of a known heat source used for calibration purposes.

The invention further includes a variable gain amplifier with an output leading to two peak-and-hold detection means (which are gated for the near rail and the far rail) which, in turn, lead to analog-to-digital converters. During regular operation, the analog-to-digital converters communicate with alarm logic. During calibration, the analog-to-digital converter corresponding to the "in-gate" rail communicates with the variable gain amplifier via a bus. The variable gain amplifier initializes at an amplification of one and increases its amplification until a pre-determined signal level is received from the analog-to-digital converter corresponding to the "in-gate" rail.

Thus, the above objects are effectively attained.

BRIEF DESCRIPTION OF THE DRAWINGS

Further objects and advantages of the invention will become apparent from the following description and claims wherein:

DETAILED DESCRIPTION OF THE PREFERRED EMBODIMENT

Figure 1:
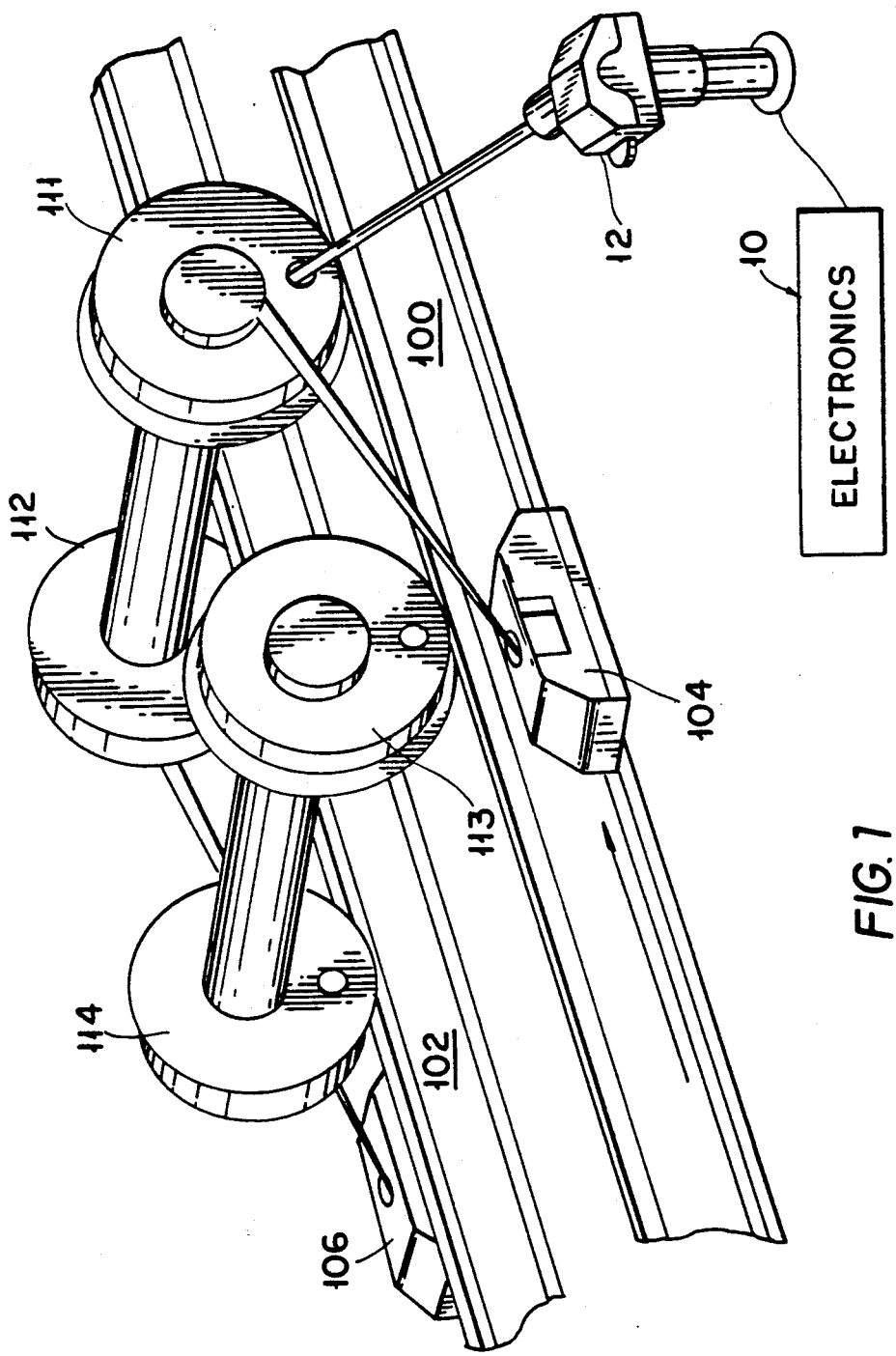
FIG. 1 is a view in elevation of a scanner in relation to passing railroad wheels and an associated or interfaced hot box detector for the monitoring of bearing temperature.
Figure 2:
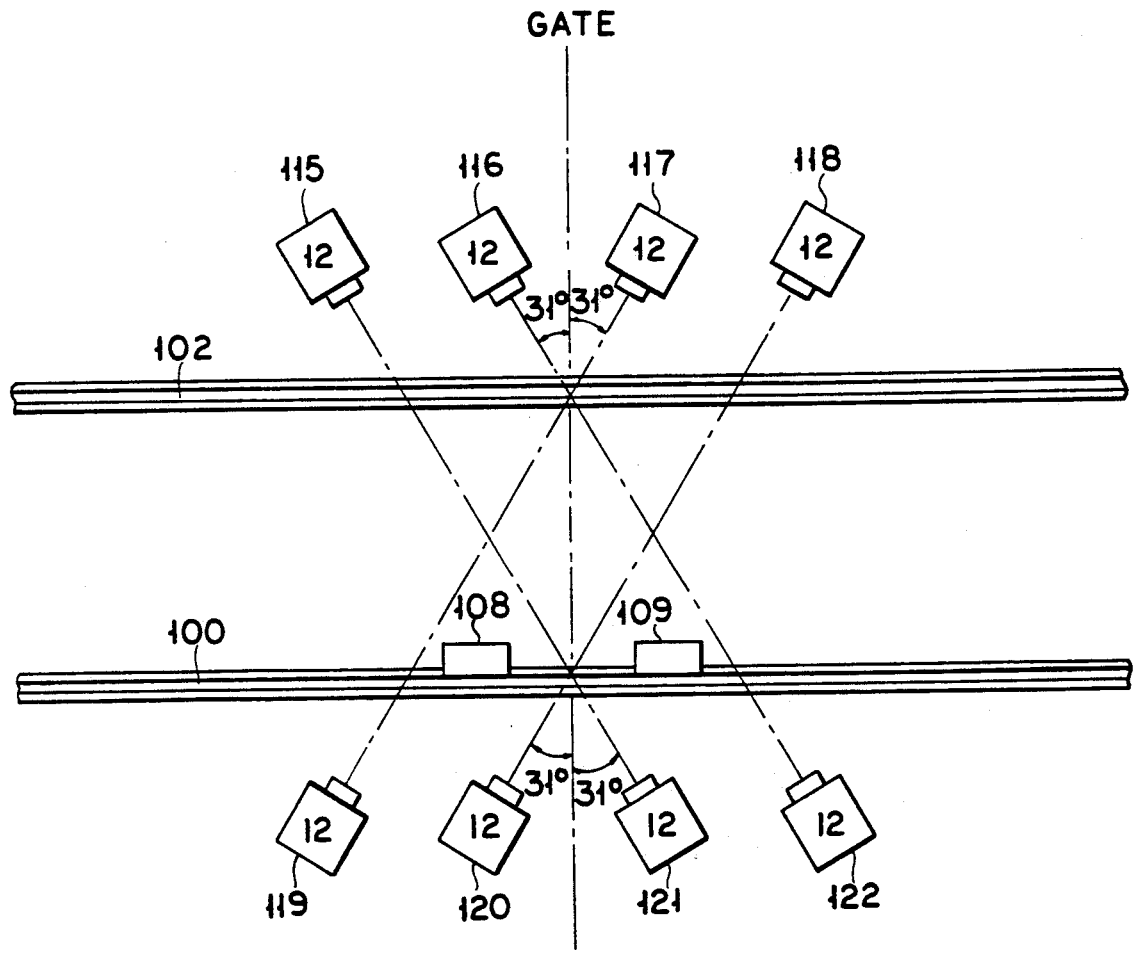
FIG. 2 is a schematic of possible hot wheel detector scanner positions in relation to the wheel gate transducers.

Referring now to the drawings in detail wherein like numerals indicate like elements throughout the several views, FIGS. 1 and 2 show the scanner 12 for use with the present apparatus 10 in relation to the near rail 100, the far rail 102, the hot box detectors 104, 106 for monitoring the bearing temperature (FIG. 1), the wheel gate transducers 108, 109 (FIG. 2) and the passing railroad wheels 111, 112, 113, 114. As the scanner 12 is oriented 31° from the perpendicular to the rails 100, 102 (see FIG. 2), the wheels are scanned in the order 111, 112, 113, 114 as the wheels move from left to right as indicated by the direction of travel arrow in FIG. 1. FIG. 2 illustrates that scanner 12 can be located in any one of positions 115-122 with respect to wheel gate transducers 108, 109. Wheel gate transducers 108, 109 determine the position and direction of travel of the wheels 111, 112, 113, 114 so as to synchronize the operation of apparatus 10 and to provide for the precise location of the overheated wheels. As the positions of wheel transducers 108, 109 define the wheel gate, positions 115, 118, 119 and 122 of scanner 12 cause scanner 12 to scan the far rail inside of the wheel gate (i.e., "in-gate") and to scan the near rail outside of the wheel gate (i.e., "out-gate") whereas positions 116, 117, 120 and 121 have the converse correspondence. For purposes of discussion, scanner 12 will be assumed to be in position 120 so that the wheels traversing near rail 100 will be scanned "in-gate" and the wheels traversing far rail 102 will be scanned "out-gate".

Figure 4:
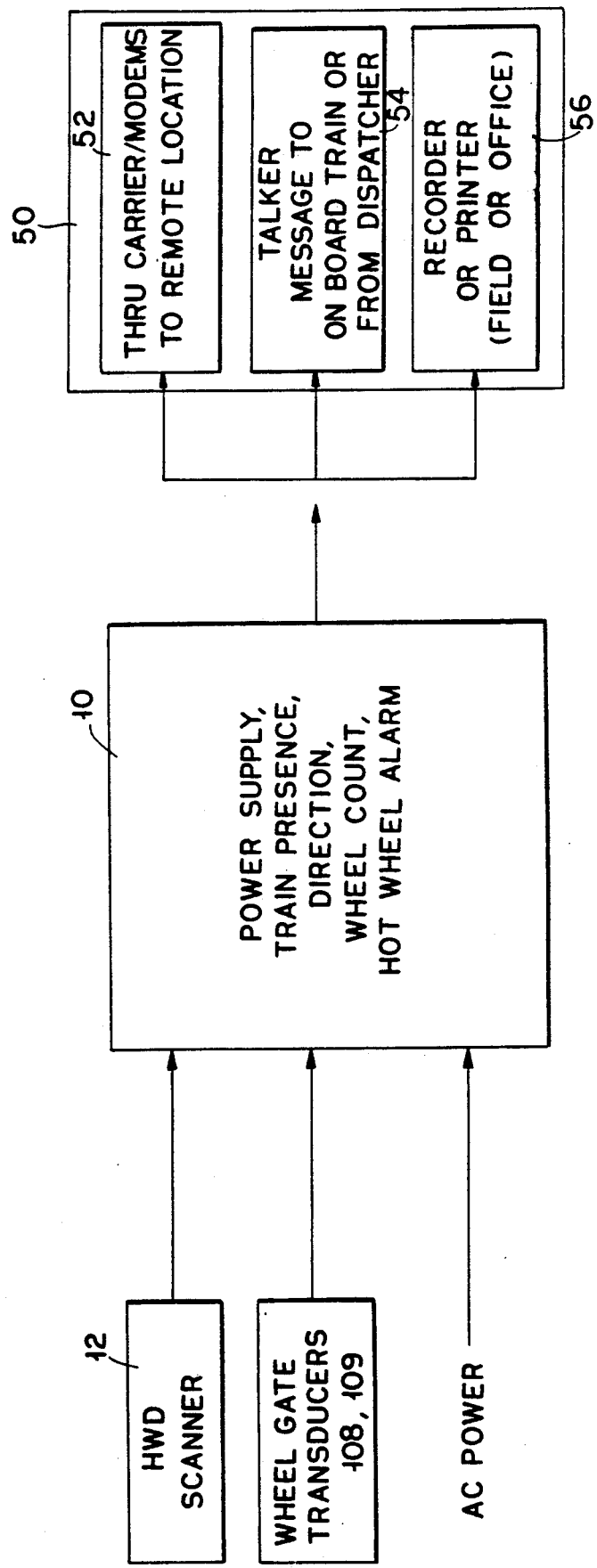
FIG. 4 is a schematic of the environment of the hot wheel detector, particularly in a stand-alone mode without hot box detectors.

Ideally, the apparatus 10, particularly the stand-alone version of FIG. 4 without the associated hot box detectors, is placed three to five miles from the railway yards so as to allow the wheels 111, 112, 113, 114 sufficient time to rise to a detectably high temperature if defects are present without having sufficient time to cause extended damage to the railroad equipment.

Figure 3:
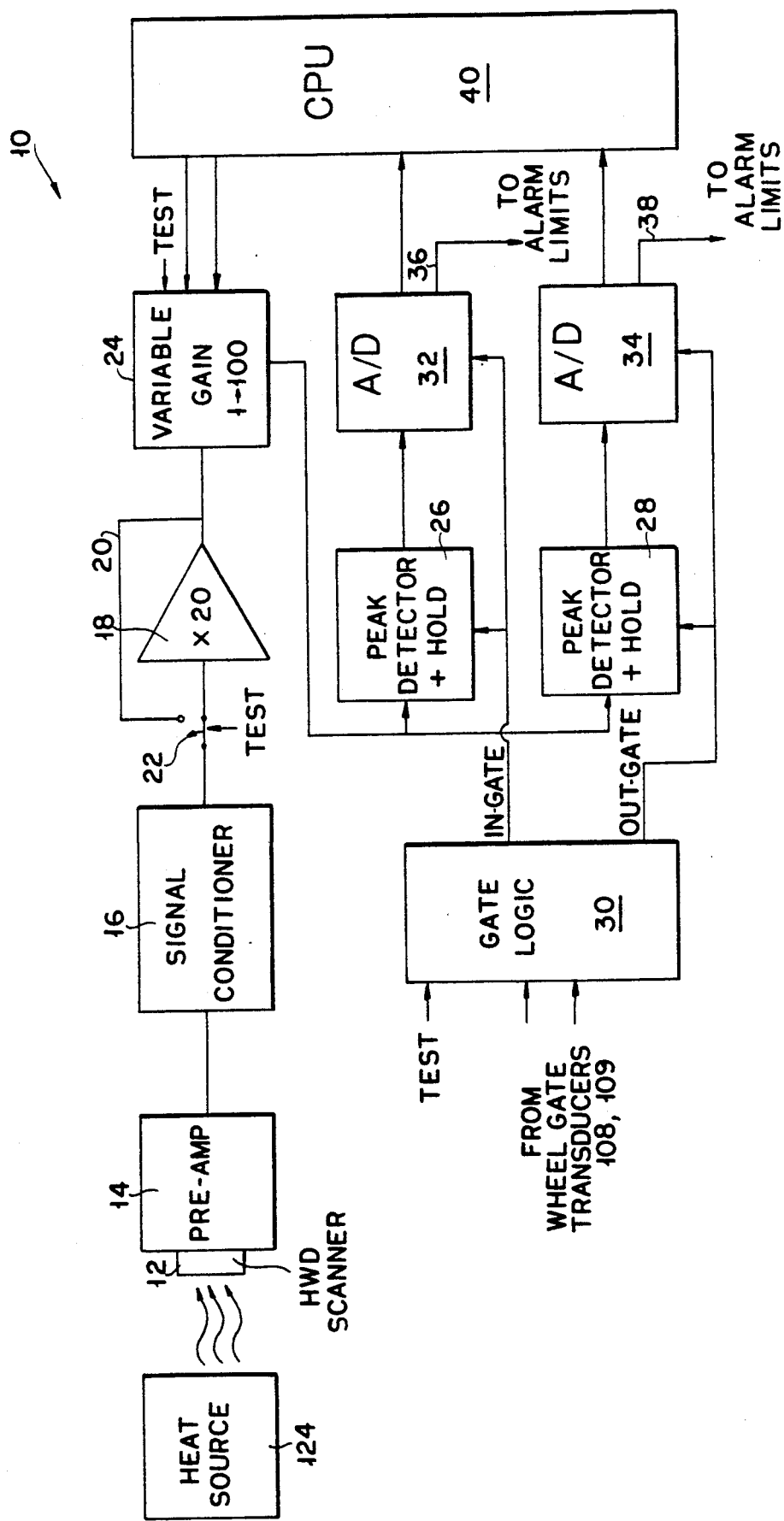
FIG. 3 is a schematic of the electronics of the hot wheel detector and the self-calibration system therefor.

FIG. 3 discloses the electronics of the apparatus 10 in more detail. Hot wheel detector scanner 12, which is typically a bolometer or other radiation detector sensitive to infrared frequencies, receives radiant energy from heat source 124. Heat source 124, during normal operation, is a passing railroad wheel 111, 112, 113 or 114 from which a two inch diameter region is scanned for temperatures as high as 900° F. However, in the calibration mode, heat source 124 is a standard calibrated one inch diameter heat source of 100° F. above ambient which is typically clamped to scanner 12.

Pre-amplifier 14 and signal conditioner 16 process the signal from scanner 12. During normal operation, amplifier 18 is by-passed via line 20 and switch 22. However, during the calibration mode, switch 22 is closed to switch amplifier 18 into the circuit. Amplifier 18 has a gain of twenty and is used to compensate for the difference in signal level when a relatively low temperature calibrated heat source is substituted for a passing railroad wheel. Variable gain amplifier 24 amplifies the signal. As will be discussed, variable gain amplifier 24 includes feedback means to adjust the gain during the calibration mode.

The output of amplifier 24 is received by peak-detector-and-hold modules 26, 28. Modules 26, 28 are alternately triggered on and off by gate logic 30 (responsive to wheel gate transducers 108, 109) as scanner 12 alternately scans wheels 111, 112, 113, 114 which are "in-gate" or "out-gate". That is, as shown in FIG. 3, input signals to the Gate Logic 30 from the wheel transducers 108, 109 are indicative of whether a particular wheel being scanned is wheel 111, 112, 113, or 114 and hence whether the signals from the scanned wheel is from an "in-gate" wheel (wheels 111 and 113 of FIG. 1 since they are on the rail closest scanner 12) or an "out-gate" wheel (wheel 112 and 114 of FIG. 1 since they are across the track from scanner 12). Gate logic 30 likewise alternately triggers analog-to-digital converters 32, 34. Analog-to-digital converters 32, 34 additionally include amplification means (which may be implemented on either the analog or the digital side) to compensate for the differences in signal strength from a scanned wheel which is "in-gate" versus "out-gate". For purposes of this discussion, the wheels on the near rail 100 are "in-gate" and the signals therefrom would therefore require less amplification than the signals from the wheels on far rail 102 which are "out-gate".

During normal operation, the signals from analog-to-digital converters 32, 34 are transmitted to alarm module 50 as shown in FIG. 4 (which typically has alarm limits of 100° to 900° F. above the ambient temperature and may include dual level hot/warm alarm levels and alarm levels which are dependent upon train direction such as to allow for normal braking for downhill travel). As shown in FIG. 4, alarm module 50 can include modems to a remote location 52, means to generate spoken messages to the train personnel 54, and/or a recorder or printer 56 in the field or office. Since the input signals to the alarm module 50 are digitized, they can be very accurately interpreted to precisely establish alarm criteria and to transmit information.

During calibration, the output from at least one (usually the "in-gate") analog-to-digital converter 32, 34 is transmitted as feedback to variable gain amplifier 24 via the data bus of microprocessor 40. Amplifier 24 is initialized with a gain of one and is repeatedly incremented until a desired digital signal value (based upon the calibrated heat source 124) is received from analog-to-digital converter 32 via the data bus of microprocessor 40. When this desired digital signal value (corresponding to a desired analog signal level) from the data bus of microprocessor 40 to amplifier 24 is achieved, the gain of amplifier 24 is latched and the calibration mode terminated.

To operate apparatus 10, the technician attaches heat source 124 to scanner 12 and pushes a button or similar device (not shown) to enter the calibration mode. Switch 22 closes to include amplifier 18 in the circuit. Variable gain amplifier 24 initializes its gain to one. Gate logic 30 triggers its "in-gate" line activating peak-detector-and-hold module 26 and analog-to-digital converter 32. Scanner 12 generates an analog signal in response to heat source 124 which is transmitted through pre-amplifier 14, signal conditioner 16, amplifiers 18 and 24, module 26 and converter 32. The digital signal is transmitted from converter 32 via the data bus of microprocessor 40 as feedback to variable gain amplifier 24. Variable gain amplifier 24 sequentially increments its gain until a desired digital signal value (corresponding to a desired analog signal level) is reached. The gain of amplifier 24 is latched. The calibration process is then terminated, switch 22 is positioned so as to bypass amplifier 18 via line 20 and normal operation is resumed.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A device for determining the temperature of portions of railroad cars passing on a railroad track, comprising:

a single scanner for receiving radiant energy and transducing the same into an electrical signal, said single scanner being positioned at an angle of substantially 31° from a perpendicular to said track so as to scan railroad wheels passing on both a near rail and a far rail with respect to the scanner;

means for variably amplifying the electrical signal, including feedback means and a feedback input, which, when activated calibrates a gain of said means for variably amplifying to assure a fixed level to said feedback input;

means for receiving the electrical signal from said means for variably amplifying and analog-digital conversion means, wherein the electrical signal from said analog-digital conversion means is transmitted to said feedback input and means for initiating calibration of the device including a predetermined radiant energy input, and means for activating said feedback means.

2. A device for determining the temperature of portions of railroad cars passing on a railroad track, said track including wheel gate transducers on each rail thereof, said device comprising:
- a single scanner for receiving radiant energy and transducing the same into an electrical signal, said single scanner being positioned with respect to said track so as to scan railroad wheels passing on both a near rail and a far rail with respect to the scanner;
- means for variably amplifying the electrical signal, including feedback means and a feedback input, which, when activated calibrates a gain of said means for variably amplifying to assure a fixed level to said feedback input;
- means for receiving the electrical signal from said means for variably amplifying;
- gate logic module means responsive to said wheel gate transducers for determining whether said means for receiving radiant energy is scanning a wheel on said near rail or said far rail with respect to said scanner;
- means for analog to digital conversion of said electrical signal wherein the electrical signal from said analog-digital conversion means is transmitted to said feedback input, said analog-digital conversion means further including compensation means responsive to said gate logic module; and
- means for initiating calibration of the device including a predetermined radiant energy input, and means for activating said feedback means.

3. The device of claim 2 further including a test amplifier which amplifies the electric signal in response to said means for initiating calibration.

4. The device of claim 2 wherein said means for receiving radiant energy scans at an angle substantially 31° from a perpendicular to the railroad track.

5. The device of claim 2 wherein the electrical signal from said analog-to-digital conversion means is transmitted to said feedback input via a microprocessor data bus means.

* * * * *